United States Patent [19]

Bartlett et al.

[11] Patent Number: 5,370,478

[45] Date of Patent: Dec. 6, 1994

[54] PROCESS FOR ISOLATING CONTAMINATED SOIL

[75] Inventors: Craig L. Bartlett, Springfield; Stephen P. Cline, Downingtown; David E. Epps, Audubon, all of Pa.; Jeff J. Jurinak, Dubai, United Arab Emirates; Mark R. Noll, Kennett Square, Pa.

[73] Assignee: E. I. du Pont de Nemours and Company, Wilmington, Del.

[21] Appl. No.: 115,928

[22] Filed: Sep. 1, 1993

Related U.S. Application Data

[63] Continuation-in-part of Ser. No. 60,387, May 11, 1993, abandoned.

[51] Int. Cl.⁵ .................... E02D 3/12; E02D 5/18
[52] U.S. Cl. .................... 405/128; 166/245; 166/292; 588/252; 588/256
[58] Field of Search ............ 166/50, 245, 292; 405/128, 267; 588/252, 256

[56] References Cited

U.S. PATENT DOCUMENTS

| | | | |
|---|---|---|---|
| 3,318,380 | 5/1967 | Tenny | 166/292 |
| 3,375,872 | 4/1968 | McLaughlin et al. | 166/292 |
| 3,722,593 | 3/1973 | Poettmann | 405/128 |
| 4,615,643 | 10/1986 | Gouvenot | 405/128 |
| 4,637,462 | 1/1987 | Grable | 166/292 X |
| 4,705,431 | 11/1987 | Gadelle et al. | 405/267 |
| 4,732,213 | 3/1988 | Bennett et al. | 166/292 |
| 4,790,688 | 12/1988 | Castor | 405/128 |
| 5,002,431 | 3/1991 | Heymans et al. | 405/128 |

Primary Examiner—George A. Suchfield
Attorney, Agent, or Firm—Charles E. Feeny

[57] ABSTRACT

Process for hydraulically guiding a layer of gellable grout solution (containing water-soluble Al or Fe salts, alkali metal silicates, or silica sols) to form a sealed confining layer beneath or around a contaminated zone beneath the water table which prevents both lateral and down-ward movement of contaminants or contaminated water.

12 Claims, 3 Drawing Sheets

PROCESS FOR ISOLATING CONTAMINATED SOIL

This is a continuation-in-part of application Ser. No. 08/060,387 filed May 11, 1993, now abandoned.

FIELD OF THE INVENTION

The present invention relates to a process for isolating contaminated soil in situ by hydraulically controlled chemical grouting.

BACKGROUND OF THE INVENTION

Containment of contaminants is a recognized need, and the use of vertical barrier walls of low permeability has been proposed for that purpose. See, for example, EPA HANDBOOK: Remedial Action at Waste Disposal Sites (Revised), EPA/625/6-85/006 (PB87-201034), Chapter 5. Also, Mclaughlin et al., in U.S. Pat. No. 3,375,872, disclose the use of injection and extraction wells to inject low pH (<1.5) silicic acid solutions into oil field zones of high permeability to water ("thief" zones), so as to plug those zones and thereby inhibit interference with successful secondary recovery water flood injection procedures. Mclaughlin et al. reported that controlling the acidity of the silicic acid solution provided control over the setting or gelling time so as to provide adequate time for the grout solution to be introduced into the thief zones. In another example, Bennett et al., in U.S. Pat. No. 4,732,213, disclose a process for plugging permeable zones in subterranean formations or subterranean leaks which comprises injecting an aqueous solution of a nonaggregated colloidal silica sol, and causing the solution to gel in the subterranean formation.

However, known containment techniques do not create any underlying barrier to provide downward control, or what might be termed a "floor". The need for such an confining layer or impermeable floor sealed to the perimeter wall becomes obvious when various situations are considered. For example, when the water table within a substantially impermeable vertical perimeter is above that of the surroundings, hydrostatic pressure will drive contaminated water from within the contaminated zone below the perimeter wall in the form of a plume free to move horizontally or down into other groundwater strata or aquifers. A second situation exists when a zone is contaminated by a water-immiscible liquid which is denser that water (such contaminants are frequently referred to as Dense Non-Aqueous Phase Liquids or DNAPLs). Chlorinated hydrocarbons, such as tetrachloroethylene, are examples of DNAPLs. Such dense contaminants may flow downwards under gravity to contaminate a lower aquifer even if there is no flow of groundwater downward from the contaminated zone to the lower aquifer. The site topography can present yet another limitation to the use of vertical containment barriers. A vertical slurry wall can be keyed into an underlying geological layer. But in order for the underlying geological layer to function as a confining layer (floor), it must be: of sufficiently low permeability adequately to retard downward migration of the contaminant; of sufficient thickness to permit formation of an adequate key (typically 2–3 feet); at a depth of less than about 70 feet if costs are not to increase to an unacceptable level; and continuous beneath the contaminated zone.

Contaminated sites where there is no naturally occurring underlying layer which serves as a barrier to downward migration of contaminants meeting all of the foregoing requirements are common. By way of example, three common naturally-occurring situations in which the lower confining layer is inadequate are situations in which the contaminated site is underlain by: sand or other strata of high permeability; a discontinuous impermeable layer, as would exist with a discontinuous layer of clay (often termed clay lenses due to the characteristic vertical section of the clay deposits); or by a layer of fractured rock wherein the fractures provide channels through what otherwise might be a satisfactorily impermeable confining layer.

Man-made underlying barriers are in use in sites containing contaminants; e.g. that is normally so in a properly constructed hazardous landfill, where a floor of heavy duty plastic sheeting over a constructed, compacted, and impervious layer of clay may be laid down during construction. However, such a floor can not be built beneath pre-existing contaminated zones without first removing the contaminants, a formidable undertaking involving extensive, expensive, and possibly hazardous excavation. It is thus a technique to be avoided, if at all possible.

SUMMARY OF THE INVENTION

The present invention avoids the disadvantages of the prior art in providing a novel process for hydraulically guiding a layer of the grout solution so as to form, after setting or gelling, a sealed confining layer beneath or around a contaminated zone which prevents both lateral and down-ward movement of contaminants or contaminated water. This invention provides a process which permits isolation and containment of a contaminated zone by the controlled placement of chemical grout at locations designed for the specific hydrological and geological environment of the contaminated zone. It creates a confining layer sealed to impervious perimeter walls. In pertinent part, the invention relates to a process for establishing a grout seal beneath a contaminated zone when a natural confining layer of adequate integrity and impermeability does not exist at a practical depth.

DETAILED DESCRIPTION OF THE INVENTION

The embodiment taken along line E1-I-E4, an aqueous stream which can be caused to form a gel is injected into the saturated zone 1 below the water table 2 through well screens 3 in injection well I, and groundwater is removed from the saturated zone 1 through well screens 4 in extraction wells E1 through E6. The combined effect of injection step and groundwater removal step is to cause aqueous stream 5 to proceed from the injection well toward the extraction wells E1 through E6. As a result, the saturated zone within the area E1 E2 E3 E4 E5 and E6 is filled with the gellable liquid which upon gelling encapsulates any contaminant which may be present.

Figure 1A:
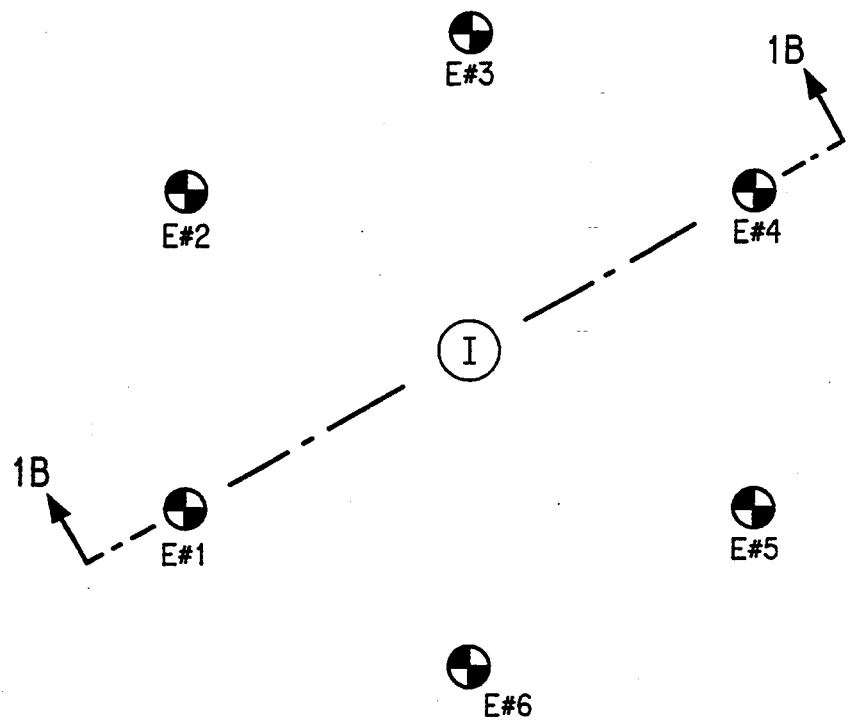
FIG. 1A is a plan view of one embodiment of the present invention.
Figure 1B:
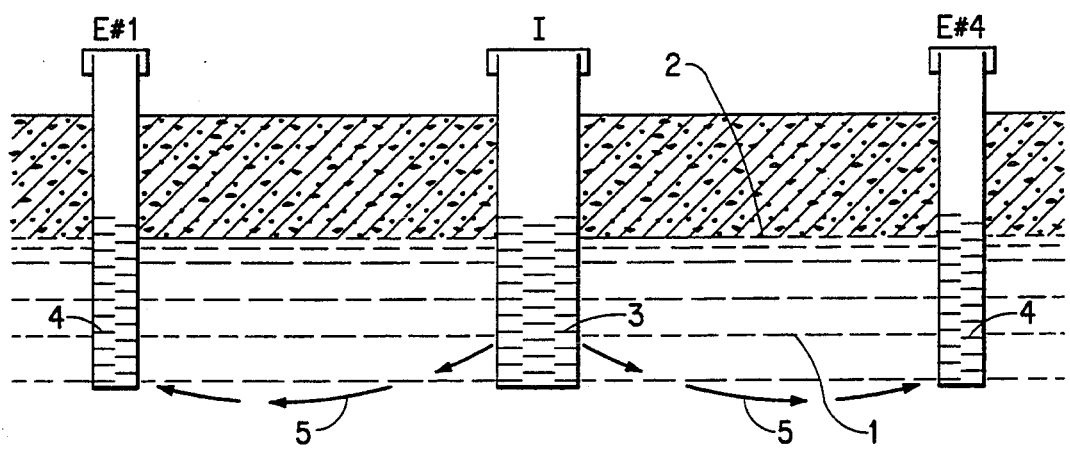
FIG. 1B is a cross-sectional view of that embodiment taken along line E1-I-E4.
Figure 2A:
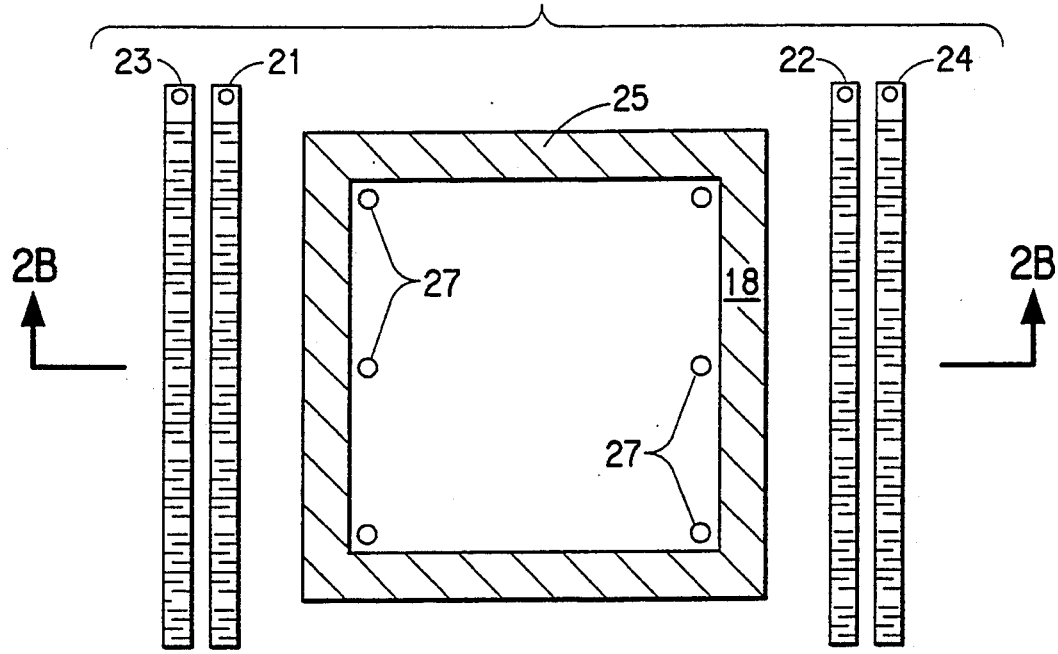
FIG. 2A is a plan view and FIG. 2B a cross-sectional view (along line 23-21-25-27-27-25-22-24) of another embodiment of the process of this invention.
Figure 2B:
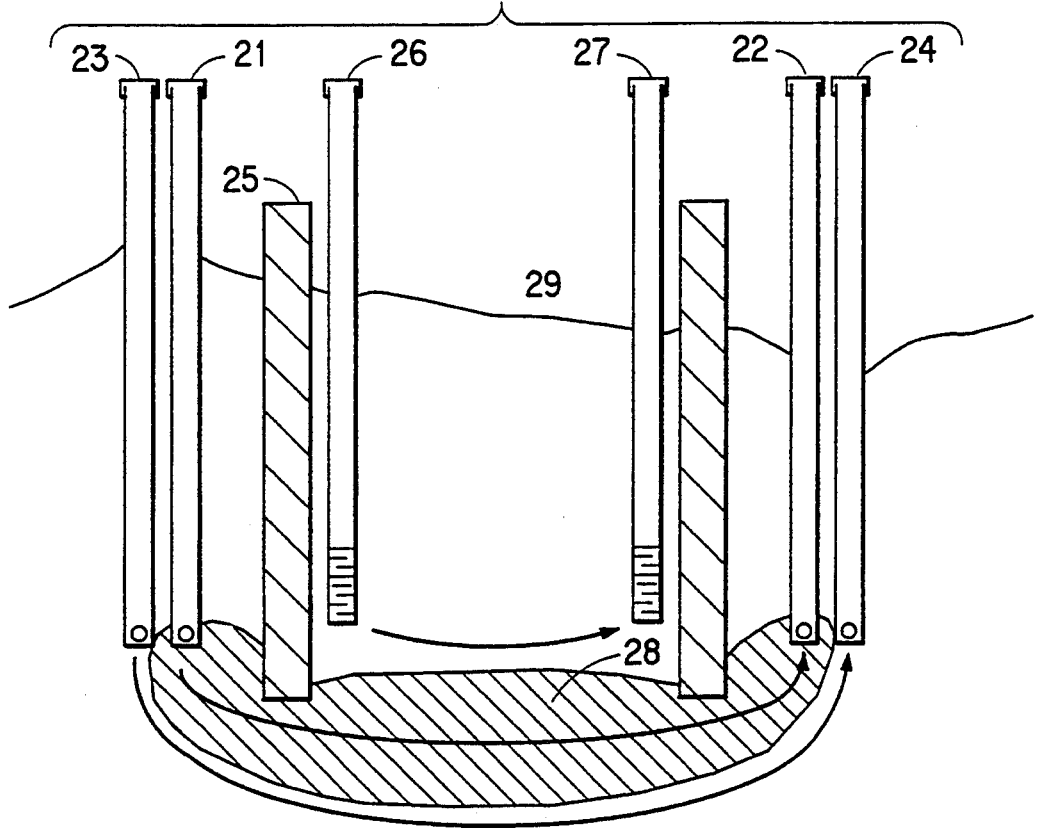

In the FIG. 2 embodiment, a vertical wall 25, commencing at grade level and continuing below the water table 29, surrounds a contaminated area. Water is pumped into the saturated zone beneath the water table 29 through well screenings of circulation wells 26, and is removed through circulation wells 27. An aqueous stream which is capable of being gelled is injected through horizontal injection wells 21, and groundwater is removed by horizontal extraction wells 22. Water is injected into said zone through horizontal injection wells 23 and removed through horizontal extraction wells 24. The water being circulated by circulation wells 26 and 27 in conjunction with injection wells 23 and extraction wells 24 directs the flow of the gellable material. Thus, the water being circulated by circulation wells 26 and 27 restrains movement of the gellable material toward grade surface, and the water circulated by injection wells 23 and extraction wells 24 restrains movement of the gellable material downward. As a result, a floor 28 is formed underneath the area of contamination which becomes substantially impermeable upon gelling. By placing horizontal wells 23 and 24 at a lesser depth than vertical wall 25, and the lower end of circulation wells 26 and 27 at an even lesser depth, the gelled floor 28 becomes keyed to vertical wall 25.

While the process of this invention relates relates to formation and placement of substantially impermeable barriers under and around contaminated zones located beneath the water table, it is necessary to understand the preparatory step leading up to the step of that process; i.e. assessment, modeling and system design.

The objective of the assessment phase is to gain an understanding of the physical and chemical characteristics of the application site. The physical characteristics of the site may include, but are not limited to: subsurface and surface geologic units (e.g., migration barriers), hydrogeologic relationships (e.g., ground water table, subsurface flow patterns, etc.), geomorphologic setting, and topographic relationships (e.g., surface water bodies to water table). Chemical characteristics may include, but are not limited to: species of contaminant, solubility coefficients, location and extent of contaminants, persistence, biodegradability, treatability, and partitioning coefficients. Data regarding these characteristics may be obtained via several methods. These methods are well documented in the literature (e.g., EPA references "Guidance on Remedial Investigations under CERCLA" EPA/540/G-85/002 and "Compendium of Superfund Field Operation Methodologies" EPA/540/P-87/001) and may include, but are not limited to: existing data review, non intrusive surveys (e.g., geophysical surveys), soil borings, monitoring wells, core samples, and laboratory analysis of soil, surface water, sediment, and ground water samples.

The modeling and system design phase consists of two stages, conceptual/numerical modeling and engineering design. The objective of the modeling stage is to provide the parameters upon which the grouting system will be designed (i.e., location and type of injection and/or extraction points). The first step is to use the data generated during the assessment phase to form a conceptual hydrogeologic model of the site. This model will describe the interactions of the physical and chemical characteristics of the site. Output of this model will serve as the basis for parameter input to numerical ground water flow and transport models. The flow and transport models used on projects to date are "MODFLOW" (McDonald and Harbaugh 1984) and "MT 3-D" Zheng (1991). The flow model is a widely accepted, used and well documented as a modular, three dimensional model for the simulation of fluid flow in ground water systems. A numerical model such as "MODFLOW" allows the incorporation of non-uniform site specific characteristics such as aquifer conductivity, hydrologic unit thickness and flow boundary conditions. The transport model is a modular three-dimensional model for simulation of advection, dispersion and chemical reactions of dissolved constituents in ground water systems. The transport model should be able to be used in conjunction with the flow model. The objective of the system design stage is to provide the engineering and hydrogeologic parameters necessary to construct a horizontal or vertical barrier that will impede the migration of ground water and subsequently contaminants from a specific location. Based on the conceptual hydrogeologic model and results of the numerical modeling a grout installation system design may be initiated. The final design will be dependent upon the existence of natural and/or man-made migration barriers present at the site.

Injection and extraction wells are next drilled according to the system and design plan. Grout solution and water are injected and extracted according to the transport and flow models. Inspection wells can be used to monitor the placement and effectiveness of the perimeter impervious barrier and the oriented grout barrier beneath the contaminated zone. Injection and extraction wells may be installed using drilling techniques described in Ground Water and Wells, Driscoll, 1986. The final well array is determined during the system design stage using the ground water flow and transport models. Then the process of this invention is carried out. The contamination zone, now hydraulically contained, will not spread or migrate, e.g. to aquifers, and is rendered amenable to conventional or innovative methods for decontamination or fixation such as: chemical solidification or stabilization, ground water withdrawal and treatment, in situ biological treatment, in situ vitrification, soil vapor extraction, soil washing, thermal desorption, or the like.

An important feature of this invention is the use of water injection and extraction to contain the flow of the grout solution between the grout injection and extraction locations. Without the water injection and extraction, the grout solution may disperse widely in the ground, becoming too diluted with groundwater to form an impervious layer. The degree of control established by the water injection and extraction wells also minimizes the amount of grout solution required to form an impervious layer. Another important feature of this invention is the placement of injection and extraction wells within the impervious perimeter. By proper injection or extraction of fluid within the impervious perimeter, the grout layer can be prevented from bulging up into the perimeter or bulging down excessively below the contaminated zone. A grout layer that bulges up or down excessively will require additional grout for the now more extensive impervious layer.

The selection of the grout material may be determined by site requirements and availability, but the grouting solution must be a flowable liquid solution with density and viscosity similar to that of water, and with delayed but predictable setting or gelling times in the groundwater environment. The delay before setting or gelling must be long enough to move the chemical grout from the injection wells to the extraction wells, a time period determinable from the hydrologic characteristics of the site. The grout solution must not depend on suspended material for its function, as a disperse phase can be filtered or absorbed as it moves through the soil. Preferred are grout solutions with specific gravity of 0.9–1.5, viscosity of 0.9–5.0 cp at >4° C., and with setting or gelling times of 1–2,000 hours, most preferably 40–400 hours. A variety of materials satisfy the foregoing requirements. For example, one may use water-soluble metal salts which will form a gel on hydrolysis, such as ferrous and ferric sulfates, nitrates, chlorides, bromides, iodides; the corresponding salts of aluminum are useful also. Likewise. one may use water solution of alkali metal silicates, such as sodium silicates and potassium silicates, and one may use sols of fumed silica.

Of particular interest are non-aggregated colloidal silica sols having average particle diameters in the range between 4 and 100 nanometers, preferably between 4 and 22 nanometers, and most preferably between 7 and 22 nanometers. exemplified by, but not limited to, "LUDOX® SM" colloidal silica (from DuPont). A most preferred embodiment is exemplified by "LUDOX® SM" colloidal silica (from DuPont).

Gelling of the non-aggregated colloidal silica sol is affected by a number of factors. Smaller particle size can promote faster gelling of the nonaggregated colloidal silica sol. Both low and high pHs can cause long gelling times and intermediate pHs short gelling times. Generally, the pH upon initial injection into the saturated zone should be between 3 and 10, preferably between about 5 and 9.5 most preferably between 5.5 and 7.5 Buffers can be added, if desired, to adjust the initial pH or to help keep the pH of the solution within the desired range. The temperature of the aqueous solution of the silica sol also affects the formation of the colloidal silica gel; higher temperatures generally favoring more rapid gelling. Gels can be formed from the aqueous nonaggregated colloidal silica sols at temperatures from 5° to 200° C. or higher. Such gels are stable indefinitely at temperatures between 5° and 200° C. and are stable for a few days at temperatures as high as 260° C. Because of their exceptionally low permeabilities, the gels of the invention can withstand contact by fluids having temperatures as high as 350° C., e.g., steam.

Not only is particle size of the colloidal silica sol a factor in the rate at which the colloidal silica gel is formed, so is the concentration of the colloidal silica sol in the aqueous solution. Higher concentration of silica sol in the aqueous solution promotes higher gelling rates. In general, concentrations in the range between 1 and 70 weight percent colloidal silica can be used. Commercial silica sols are available at concentrations running between 30 and 50 weight percent. Those commercial sols can be used as such or diluted to a lower silica content. For example, sols containing 2–40 weight percent of silica are generally used for the purposes of this invention. Typically, the sol is diluted to 5–15 weight percent silica for use according to the invention. However, colloidal silica concentrations may vary with the use to which the colloidal silica solutions of the invention are put.

The total ionic strength of the colloidal silica sol also ill affect gelling. In general, the total ionic strength should be less than about 10, preferably less than 3.5, and most preferably 0.75 or less (sea water is about 0.72). Inorganic ions such as potassium, sodium, magnesium, calcium, chloride, sulfate, bisulfate, carbonate, or bicarbonate may be present naturally in the water used to prepare the solution, or they may be added intentionally so as to adjust the ionic strength. Polyvalent cations have a greater effect on gel time than their contribution to ionic strength would indicate. In field operations, the ionic strength of the treatment solution is one variable that can be adjusted to achieve a given gel time. However, to minimize the possibility of interaction with the formation or formation waters, a slug of a brine of appropriate ionic composition may be injected as a preflush. (For a definition of ionic strength, see W. J. Moore, Physical Chemistry, 4th edition, Prentice Hall, Inc., New Jersey, 1972, pg. 443.)

The desired gel time will vary depending upon the circumstances. The present invention makes possible both short gel times and very long ones. When long gel times are needed, ideally one should vary the gel time of the compositions being injected into the formation so that the last portion of the aqueous solution of nonaggregated colloidal silica sol to be injected into the formation will gel at nearly the same time as, or soon after, the first portion gels. The present invention permits tailoring gel time also as to permit one to effectively deal with just that type of situation.

In another embodiment of the invention, one or more latent gelling agents is combined with the aqueous nonaggregated colloidal silica sol. The latent gelling agents are not essential to gel formation. They can accelerate or delay gel formation. In most instances, the latent gelling agent accelerates gelation in comparison to the unmodified solution. However, it is important to note that often the intent in adding a latent gelling agent, even if it speeds gelation, is to more effectively obtain long gel times. Gels must be cured for some multiple of the initial gel time to reach full strength. This is because the factors that promote gelation also promote gel strengthening. As a consequence, in the absence of a latent gelling agent, if one adjust conditions in a gelable formulation to give a long gel time, one may need to wait a very long time after gelation for the gel to strengthen sufficiently to bock flow. One way around this problem is to add a latent gelling agent that before and/or shortly after gelation shifts conditions such a pH or ionic strength into a regime in which gelation, and hence gel strengthening, is faster than if the conditions in the absence of the latent gelling agent were maintained. This gives a faster gel strengthening than if the same gel time were achieved without the use of a latent gelling agent. The latent gelling agent may also make it easier to precisely engineer long gel times than if one relies solely on initial adjustment of pH and ionic strength.

Examples of assessment/modeling & system design/placement can be found in In Situ Permeability Reduction and Chemical Fixation Using Colloidal Silica by Noll et al., The Proceedings of the Sixth National Outdoor Conference presented May 11–13, 1992 by the National Ground Water Association.

The following Examples further illustrate the invention.

EXAMPLE 1

Field Pilot of Horizontal Grout Barrier
  (a) DESIGN. Soil borings and aquifer testing (both pumping and recovery) were completed at various areas to assess the physical characteristics of the site. Results of these tests indicated that the underlying strata consisted to a uniform fine- to medium-grained sand with a hydraulic conductivity of $1.3 \times 10^{-2}$ cm/sec. The saturated thickness of the unit was measured in each soil boring and averaged 30 feet. The water table was encountered from 2 to 3 feet below ground surface.

The "MODFLOW" (McDonald and Harbaugh 1984) and "MODPATH" (Pollock 1989) groundwater flow and transport models were used to design the most efficient injection system, provide injection and withdrawal rates, estimate travel times, and determine the boundaries of potentially gelled areas.

Simulation results for the horizontal permeability barrier (FIGS. 2A and 2B) indicated that a set of grout injection 21 and withdrawal 22 and water injection 23 and withdrawal 24 horizontal wells, each operated at a rate of 1.5 gal/min (below the water table 29), would cause the grout to move in a lateral direction below the cement-bentonite slurry walls 25 into an area approximately 14 by 12 by 6 feet thick over a 36-hour period. Each horizontal well was constructed of 2-inch-ID PVC pipe with No. 10 factory-slotted screen. To keep the grout from moving up inside the slurry wall area, a set of three vertical injection 26 and withdrawal 27 wells were included in the simulation to circulate groundwater at a rate of 0.1 gal/min.

(b) IMPLEMENTATION. Delivery System: Sealed magnetic centrifugal pumps attached to polyethylene tubing were used to inject grout solution and extract groundwater. Injection and extraction flow rates were controlled using a calibrated flow meter attached to a needle valve.

Batch Preparation

In order to prevent premature gelation of the grout prior to ending the injection portion of the study, grout batches were mixed with set times of approximately 72 hours for the horizontal barrier. To prepare a batch of colloidal silica grout for injection, 385 gallons of groundwater were transferred into the 500-gallon polypropylene tank. Next, 40 pounds of sodium chloride were slowly added and mixed into the tank until the solid was fully dissolved. Then, 30 weight percent colloidal silica (DuPont "LUDOX® SM") was added to the tank and mixed thoroughly until a 5 weight percent silica solution was produced. Finally, 3785 ml of 27.8 wt. % hydrochloric acid were added to the tank. A total of 5,850 gallons of prepared grout were injected in the horizontal barrier pilot test area. Grab samples of each "LUDOX" batch were collected to record gelation times.

Injection

The colloidal silica grout mixture was injected for a total of 72 hours, the time at which the first batch of grout gelled.

(c) VERIFICATION. Ground-penetrating Radar (GPR). A GPR investigation was performed to determine the feasibility of using a nonintrusive method to identify subsurface grout mass locations and dimensions. GPR is a geophysical technique that measures changes in the propagation of electromagnetic energy in the ground to produce an image of subsurface conditions. Based on the difference in the dielectric constant between the various features present in the subsurface (e.g., lithologic boundaries), a high or low amplitude GPR signal is reflected at the boundary of the feature. The data is displayed in the field on a color monitor for on-site analysis and recorded on magnetic tape for subsequent interpretation.

The GPR investigation was conducted over a 30-by-30-foot, 2-foot-center survey grid established in the study area. Prior to taking any measurements, the field instruments were calibrated in accordance with the manufacturers' instructions to achieve an average penetration depth of 15 to 20 feet below ground surface. A 500-MHz transducer was used to conduct the GPR survey. Survey lines were conducted in both north-south and east-west directions across the preestablished grid. The GPR data was collected by pulling the GPR antenna directly across the ground surface, thereby producing a continuous profile of subsurface conditions.

Soil Coring

To verify the GPR results on the dimensions of the gelled area, 5 soil borings were completed throughout the gelled zone. At each boring site a continuous core was collected to a depth of 15 feet below surface. The cores were analyzed in the field for the presence of the colloidal silica grout by means of an indicator solution. Results of the coring confirm the dimensions of the gelled zone established by GPR.

Permeability Testing

A falling head slug test was conducted in a well within the gelled zone to determine the permeability of the gelled grout 28. This test determined that the permeability was approximately $8 \times 10^{-7}$ cm/sec.

EXAMPLE 2

Mesocosm Vertical Barrier Test.

Figure 3A:
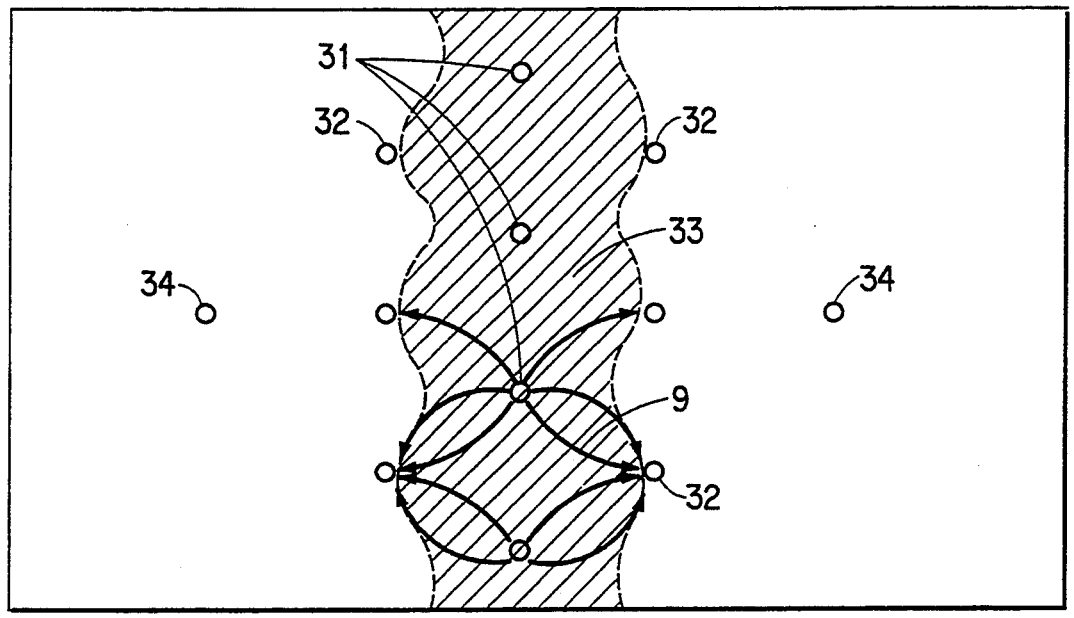
FIG. 3A is a plan view and FIG. 3B is a cross-sectional view (along line 34-32-33-31-33-32-34) of yet another embodiment of the present invention.
Figure 3B:
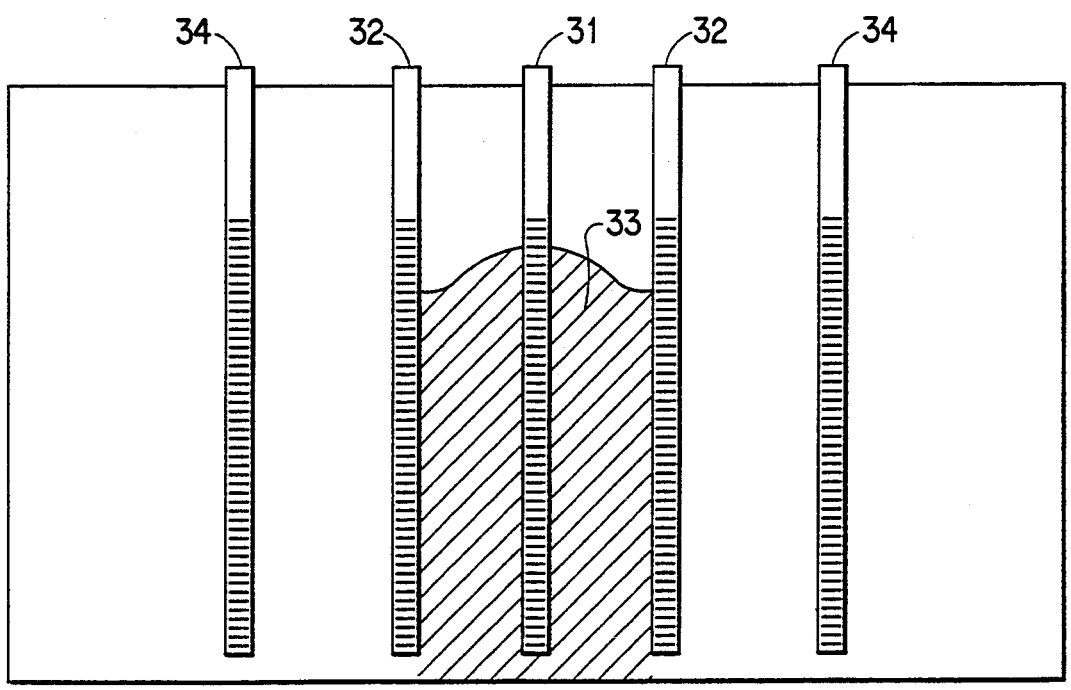

A sandbox mesocosm (FIG. 3) was used to evaluate the ability to construct in situ a permeability barrier with a predominately vertical orientation. The mesocosm is 6 feet wide by 12 feet long by 4 feet deep, and was filled with a medium- to fine-grained sand to conduct experiments. The experiments were designed to simulate application of the technology described. Aquifer characterization tests were conducted on the mesocosm to determine the hydraulic conductivity and solute advection and dispersion of the sand. These tests comprised both a series of pumping tests and a chloride tracer test. Computer flow and transport modeling was used to design the vertical barrier construction experiment. The numerical groundwater flow model "MODFLOW" (McDonald and Harbaugh, 1984), and numerical transport model "MT3D" (Zheng, 1991) were used. Information from the aquifer characterization tests were used to calibrate the models. The models were then used to design an injection/withdrawal experiment to construct a bisecting permeability barrier across the middle of the mesocosm. The experiment was conducted using a center row of 4 equally spaced grout injection wells 31, flanked on both sides by offset rows of 3 fluid withdrawal 32 wells. The total grout injection rate was 1000 ml/min. divided equally between each of the four grout injection wells. The total fluid withdrawal rate was also 1000 ml/min. divided equally between the 6 fluid withdrawal wells. An aqueous colloidal silica grout, described below, was injected for a total of 14 hours, and allowed to gel. Each batch of aqueous colloidal silica grout consisted of 147 liters of water, 26 liters of a 30 wt % solution of "LUDOX® SM" colloidal silica sol, 11.105 kg of a 20 wt % sodium chloride solution and enough 28% hydrochloric acid to provide a final pH of 6.

Post injection testing consisted of determining the effective hydraulic conductivity across resulting barrier 33. This was completed by adjusting the water levels on either side of the barrier to create a 1 foot difference in hydraulic head. The water levels on each side were measured in monitor wells 34 for a period of 12 days. From the change in water levels, the hydraulic conductivity was determined. Initial hydraulic conductivities determined during the aquifer characterization tests was found to be $3 \times 10^{-2}$ cm/sec. After construction of barrier 33, the hydraulic conductivity across barrier was found to be $4 \times 10^{-6}$ cm/sec.

We claim:

1. A process for the in situ formation of continuous, substantially impermeable barriers in the saturated zone below the water table which comprises (a) injecting into a first location in said zone an aqueous stream which can be caused to form a gel, (b) removing groundwater at a second location in said zone which is spaced horizontally from said first location, and (c) causing said stream to gel, the combined effect of injection step (a) and groundwater removal step (b) being to cause said aqueous stream to proceed from said first location toward said second location; said aqueous stream being an aqueous solution or sol having a viscosity and density similar to that of water, and a gelling time sufficiently long to allow subsurface migration from the point of injection to the point at which water is removed from said second location.

2. The process of claim 1 wherein said aqueous stream which is capable of forming a gel comprises a silica sol, a water solution of an alkali metal silicate, or a hydrolyzable water-soluble salt of iron or aluminum.

3. The process of claim 1 wherein said aqueous stream which is capable of forming a gel is pumped into one or more injection wells and groundwater is pumped out of extraction wells, thereby creating a hydraulic gradient between the injection and extraction wells thus allowing said stream which can be caused to form a gel to flow from the injection well to the extraction well creating a continuous fluid layer which is allowed to gel in situ to create a barrier.

4. The process of claim 1 wherein the injected solution, and the resultant chemically reactive gel barrier have a high affinity for, reaction with or adsorption of heavy metals from solution, thus giving said barrier the ability to reduce contaminant migration by permeability reduction and by the sorption and resultant retardation of metals in solution.

5. The process of claim 4 wherein heavy metals are lead, chromium, or zinc.

6. The process of claim 1 wherein said aqueous stream is substantially free of suspended material which will filter out of said stream as it passes through the soil in said saturated zone.

7. The process of claim 1 wherein said aqueous stream has a specific gravity in the range between 0.9 and 1.5, a viscosity in the range between 0.9 and 5.0 cp at a temperature above 4° C., and a setting time in the range between 1 and 2000 hours.

8. The process of claim 1 wherein said aqueous stream comprises water-soluble metal salts which will gel upon hydrolysis, water solutions of alkali metal silicates, or silica sols.

9. The process of claim 1 wherein said aqueous stream comprises an aqueous solution or sol containing 1 to 70 weight percent of a non-aggregated coloidal silica sols having average particle diameters in the range between 4 and 100 nanometers and a pH in the range between 3 and 10.

10. The process of claim 9 wherein said solution or sol contains from 3.5 to 40 weight percent of a non-aggregated coloidal silica sol having average particle diameters in the range between 4 and 22 nanometers, a pH in the range between 5 and 9.5, and a gel time in the range between 10 and 1000 hours.

11. The process of claim 9 wherein said solution or sol contains from 4 to 10 weight percent of a non-aggregated coloidal silica sol having average particle diameters in the range between 4 and 12 nanometers, a pH in the range between 5.5 and 7.5, and a gel time in the range between 40 and 400 hours.

12. A process for the in situ formation of continuous, substantially impermeable barriers in the saturated zone below the water table which comprises (a) erecting substantially vertical walls which enclose contaminants contained in said zone; (b) injecting water into the resulting enclosed zone at a first location above the bottom and adjacent to a portion of said walls, and removing water at a second location within said enclosed zone above the bottom and adjacent to an opposing portion of said walls which is spaced laterally from said first location so as to provide an upper stream of water; (c) injecting an aqueous stream which can be caused to form a gel at a first location outside of said enclosed zone and above the bottom of said walls at a location which is spaced laterally from said first location which is within said enclosed zone, and removing water at a second location outside of said enclosed zone above the bottom and adjacent to an opposing portion of said walls which is spaced laterally from said first location outside of said walls so as to provide a gellable stream; (d) injecting water at a third location outside of said enclosed zone and above the bottom of said walls at a location which is spaced laterally outward of said first location which is outside of said enclosed zone, and removing water at a fourth location outside of said enclosed zone and above the bottom and adjacent to an opposing portion of said walls which is spaced laterally outward of said second location outside of said walls so as to provide a lower stream of water; said upper stream of water restraining movement of said gellable stream upwardly and said lower stream of water restraining movement of said gellable stream downwardly, thereby directing the flow of said gellable stream so as to provide a floor under the contaminants in said enclosed zone; and (e) causing said gellable stream to gel so as to provide a continuous substantially impermeable barrier.

* * * * *